US012384372B2

(12) United States Patent
Okuda et al.

(10) Patent No.: US 12,384,372 B2
(45) Date of Patent: Aug. 12, 2025

(54) METHOD FOR TRAINING A MAPPING FOR OUTPUTTING AN ABNORMALITY DETERMINATION VARIABLE FOR A SPECIFIC COMPONENT MOUNTED ON A VEHICLE

(71) Applicant: TOYOTA JIDOSHA KABUSHIKI KAISHA, Toyota (JP)

(72) Inventors: Koichi Okuda, Toyota (JP); Atsushi Tabata, Okazaki (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 17/383,589

(22) Filed: Jul. 23, 2021

(65) Prior Publication Data

US 2022/0073075 A1    Mar. 10, 2022

(30) Foreign Application Priority Data

Sep. 7, 2020    (JP) .................................. 2020-150018

(51) Int. Cl.
*B60W 30/18* (2012.01)
*B60W 40/02* (2006.01)
*G06F 18/214* (2023.01)

(52) U.S. Cl.
CPC ...... *B60W 30/18127* (2013.01); *B60W 40/02* (2013.01); *G06F 18/214* (2023.01)

(58) Field of Classification Search
CPC ........... B60W 30/18127; B60W 40/02; B60W 10/115; B60W 2520/105; B60W 2540/10; B60W 50/0098; B60W 2050/0082; B60W 2050/0088; G06F 18/214; B60K 6/547; B60K 6/445; F16H 61/12; F16H 3/66; F16H 2003/445; F16H 2061/0087; F16H 2061/1208; F16H 2200/0043;

(Continued)

(56) References Cited

U.S. PATENT DOCUMENTS 10,964,130 B1 * 3/2021 Dixit .................. G05B 23/0283
2006/0224367 A1 * 10/2006 Fukui ..................... G01N 29/14
                                                         703/2

(Continued)

FOREIGN PATENT DOCUMENTS

CN        107491038 A         12/2017
JP        2014092504 A    *    5/2014  ............. F16H 61/12
JP        2020-064024 A        4/2020

*Primary Examiner* — Aniss Chad
*Assistant Examiner* — Chase L Cooley
(74) *Attorney, Agent, or Firm* — Oliff PLC

(57) ABSTRACT

A training method includes: a simulation step outputting, by a simulator, a characteristic variable based on an input parameter set, the parameter set being input to the simulator and indicating that a specific component is presumed to have an abnormality in advance; and a training step updating, by a training device, mapping based on an input training data and an input teaching data, the input variables being input to the training device as the training data, the input variables including the characteristic variable output in the simulation step, the abnormality determination variable being input to the training device as the teaching data, the abnormality determination variable indicating that the specific component has the abnormality.

4 Claims, 6 Drawing Sheets

(58) Field of Classification Search
CPC ..... F16H 2200/2007; F16H 2200/2041; F16H 2200/2066; F16H 2200/2082; G06N 3/048; G06N 3/08; G06N 20/00; Y02T 10/62
See application file for complete search history.

(56) References Cited

U.S. PATENT DOCUMENTS

| | | | | |
|---|---|---|---|---|
| 2015/0134291 | A1* | 5/2015 | Fricke | G01M 17/00 702/113 |
| 2017/0357243 | A1 | 12/2017 | Takayama et al. | |
| 2017/0358151 | A1* | 12/2017 | Koons | G07C 5/08 |
| 2020/0364952 | A1* | 11/2020 | Sano | G07C 5/008 |

* cited by examiner

|  | C1 | C2 | B1 | B2 | F1 |
|---|---|---|---|---|---|
| 1st | ○ |  |  | (○) | ○ |
| 2nd | ○ |  | ○ |  |  |
| 3rd | ○ | ○ |  |  |  |
| 4th |  | ○ | ○ |  |  |
| R | ○ |  |  | ○ |  |

METHOD FOR TRAINING A MAPPING FOR OUTPUTTING AN ABNORMALITY DETERMINATION VARIABLE FOR A SPECIFIC COMPONENT MOUNTED ON A VEHICLE

CROSS-REFERENCE TO RELATED APPLICATION

This application claims priority to Japanese Patent Application No. 2020-150018 filed on Sep. 7, 2020, incorporated herein by reference in its entirety.

BACKGROUND

1. Technical Field

The present disclosure relates to a training method.

2. Description of Related Art

Japanese Unexamined Patent Application Publication No. 2014-092504 (JP 2014-092504 A) describes an abnormality determination apparatus for an automatic transmission. The abnormality determination apparatus acquires vibration data indicating a transition of vibration of the automatic transmission. The abnormality determination apparatus calculates an upper limit value of a vibration acceleration based on previous vibration data. The abnormality determination apparatus calculates a vibration acceleration based on the newly acquired vibration data. When the vibration acceleration is higher than the upper limit value, the abnormality determination apparatus determines that the automatic transmission has an abnormality.

SUMMARY

In order that the abnormality determination apparatus as in JP 2014-092504 A may accurately determine whether the automatic transmission has an abnormality, it is necessary to appropriately set the upper limit value of the vibration acceleration. However, the abnormality of the automatic transmission does not occur very frequently. Therefore, the upper limit value of the vibration acceleration needs to be set based on few data. Thus, the upper limit value of the vibration acceleration may be inappropriate.

Although the description is given above taking the abnormality determination apparatus for the automatic transmission as an example, the same applies to abnormality determination for other apparatuses. The same applies also to a case of setting a criterion of abnormality determination based on previous data, as well as the case of setting the threshold such as the upper limit value of the vibration acceleration as in the example described above.

A first aspect of the present disclosure relates to a training method to train mapping for training abnormality determination by using a simulator, a storage, and a training device. The simulator is configured to output a characteristic variable related to at least one of noise and vibration of a vehicle by an input parameter set having a plurality of condition parameters related to conditions of the vehicle. The storage stores mapping data defining the mapping for outputting, as an output variable, an abnormality determination variable indicating an occurrence possibility about an abnormality of a specific component mounted on the vehicle. The mapping data has the characteristic variable as at least one of a plurality of input variables. The training device is configured to update the mapping data defining the mapping stored in the storage by the input variables that are input as training data and the abnormality determination variable paired with the training data that are input as teaching data. The method includes a simulation step and a training step. The simulation step outputs, by the simulator, the characteristic variable based on the input parameter set. The training step updates, by the training device, the mapping based on the input training data and the input teaching data. The input variables is input to the training device as the teaching data. The abnormality determination variable indicate that the specific component has the abnormality.

According to the first aspect, even if the abnormality of the specific component actually occurs at a low frequency, a large number of characteristic variables under the assumption that the abnormality occurs can be obtained by the simulator while changing numerical values of the condition parameters as appropriate. The mapping of the mapping data is updated based on a set of a large number of pieces of the teaching data and the training data including, as the input variables, the characteristic variables under the assumption that the abnormality occurs, thereby increasing a probability that the mapping can output an appropriate output variable.

In the first aspect, the specific component may be a component on a power transmission path from a drive source of the vehicle to a driving wheel of the vehicle.

According to the configuration described above, the mapping of the mapping data can appropriately be updated for the component on the power transmission path that is likely to cause the vibration or the noise of the vehicle.

In the first aspect, one of the condition parameters may be a specific parameter indicating a property of the specific component. In the simulation step, a parameter set having the specific parameter that falls out of a predetermined normal range may be input as the parameter set indicating that the specific component is presumed to have the abnormality in advance.

According to the configuration described above, the specific parameter falls out of the normal range, and therefore the parameter set input to the simulator may be regarded as the parameter set when the specific component actually has the abnormality. Thus, the parameter set that securely reflects the abnormal state of the specific component can be input to the simulator.

In the first aspect, the characteristic variable may indicate an acceleration of the vehicle in a predetermined specific direction.

According to the configuration described above, the training effect of the mapping of the mapping data is increased in a case where the acceleration of the vehicle may change depending on whether the specific component has the abnormality.

In the first aspect, when energy of the vibration of the vehicle or the noise of the vehicle on a unit frequency basis is a power spectrum, the characteristic variable may be a variable indicating a power spectrum density at a predetermined specific frequency or in a predetermined specific frequency band.

According to the configuration described above, the training effect of the mapping of the mapping data is increased in a case where the power spectrum of the vibration or the noise may change depending on whether the specific component has the abnormality.

In the first aspect, the characteristic variable may indicate a frequency at a maximum amplitude of the vibration of the vehicle or the noise of the vehicle.

According to the configuration described above, the training effect of the mapping of the mapping data is increased in a case where the vibration or the noise may occur at the specific frequency depending on whether the specific component has the abnormality.

In the first aspect, the characteristic variable may indicate a duration of the vibration of the vehicle or the noise of the vehicle.

According to the configuration described above, the training effect of the mapping of the mapping data is increased in a case where the function of reducing the vibration or the noise may vary depending on whether the specific component has the abnormality.

In the first aspect, the characteristic variable may indicate a decrease rate of the vibration of the vehicle or the noise of the vehicle per unit time.

According to the configuration described above, the training effect of the mapping of the mapping data is increased in the case where the function of reducing the vibration or the noise may vary depending on whether the specific component has the abnormality.

In the first aspect, one of the condition parameters may be a vehicle speed.

According to the configuration described above, the characteristic variable is calculated as a result of simulation executed by the simulator based on the vehicle speed greatly related to the vibration or the noise of the vehicle. Thus, there is a greater expectation that an accurate characteristic variable is obtained.

In the first aspect, one of the condition parameters may be an operation amount of an accelerator pedal.

In the configuration described above, the operation amount of the accelerator pedal is related to acceleration or deceleration of the vehicle. The acceleration or deceleration of the vehicle is greatly related to the vibration or the noise of the vehicle. According to the configuration described above, there is a greater expectation that an accurate characteristic variable is obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figures 1, 2:
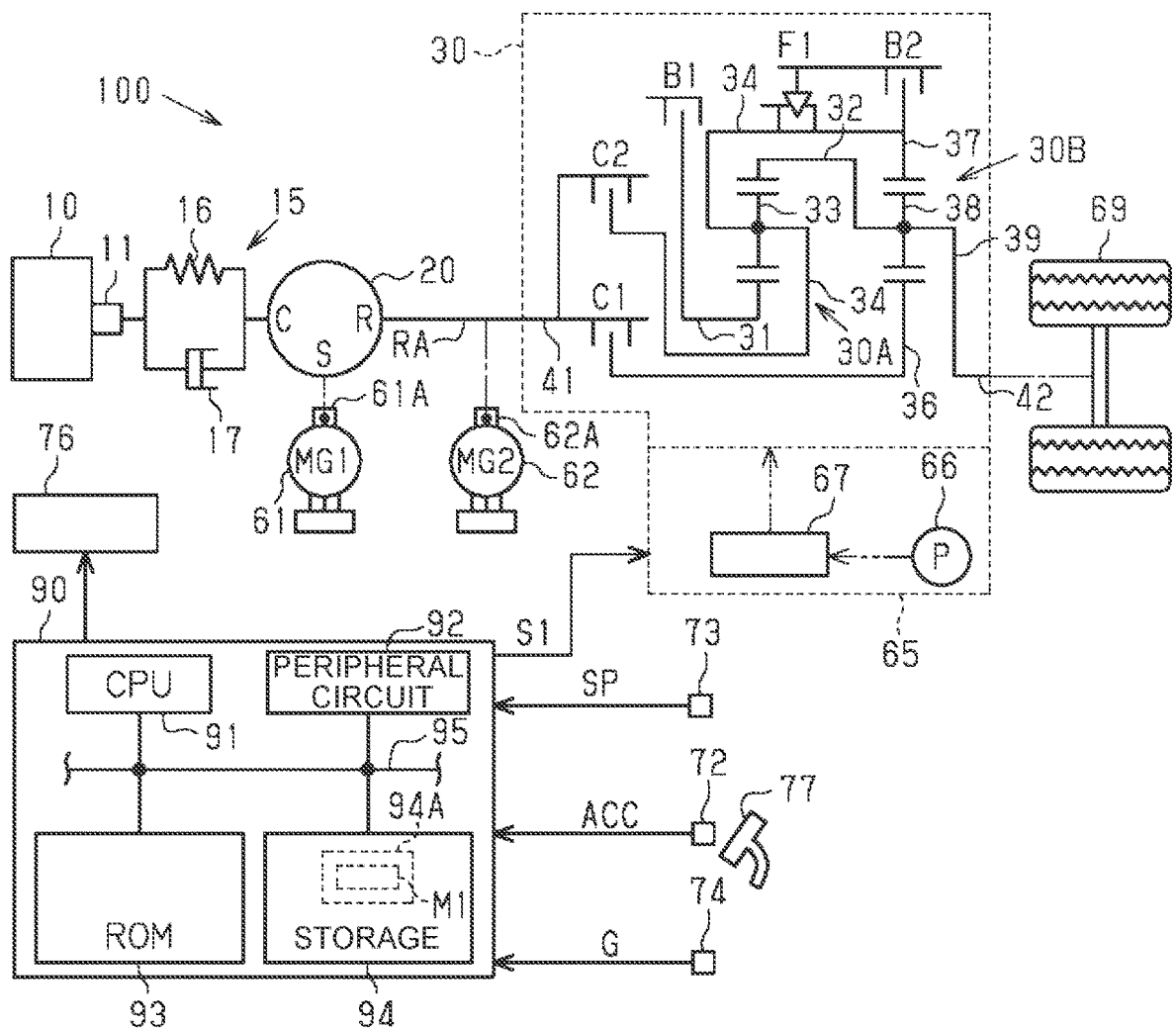
FIG. 1 is a schematic structural diagram of a vehicle.
FIG. 2 is an explanatory drawing illustrating relationships between gear stages of an automatic transmission and engagement elements.

One embodiment of the present disclosure is described below with reference to FIG. 1 to FIG. 7. First, the overall structure of a vehicle 100 is described. As illustrated in FIG. 1, the vehicle 100 includes an internal combustion engine 10, a damper 15, a power split device 20, an automatic transmission 30, driving wheels 69, a hydraulic apparatus 65, a first motor generator 61, and a second motor generator 62.

The internal combustion engine 10 has a crankshaft 11 that is an output shaft. The crankshaft 11 is coupled to the power split device 20 via the damper 15. The damper 15 has a damper body 16 and an attenuator 17. The damper body 16 is interposed between the crankshaft 11 and the power split device 20, and has a plurality of coil springs arranged in a circumferential direction. Through elastic deformation of the coil springs of the damper body 16, the damper body 16 transmits a torque between the crankshaft 11 and the power split device 20 while suppressing torsional vibration between the crankshaft 11 and the power split device 20 due to, for example, torque fluctuation. The attenuator 17 is interposed between the crankshaft 11 and the power split device 20. The attenuator 17 damps vibration due to restoration of the damper body 16 by restricting an abrupt change along with the restoration after the elastic deformation of the damper body 16.

The power split device 20 is a planetary gearing mechanism including a sun gear S, a ring gear R, and a carrier C. The carrier C of the power split device 20 is coupled to the crankshaft 11 via the damper 15. The sun gear S is coupled to a rotational shaft 61A of the first motor generator 61. A ring gear shaft RA that is an output shaft of the ring gear R is coupled to a rotational shaft 62A of the second motor generator 62. The ring gear shaft RA is also coupled to the automatic transmission 30.

The automatic transmission 30 has an input shaft 41 and an output shaft 42. The input shaft 41 of the automatic transmission 30 is coupled to the ring gear shaft RA. The output shaft 42 of the automatic transmission 30 is coupled to the right and left driving wheels 69 via a differential gear (not illustrated).

When the internal combustion engine 10 is driven and a torque is input to the carrier C of the power split device 20 from the crankshaft 11, the torque is split into a torque on the sun gear S side and a torque on the ring gear R side. When the first motor generator 61 operates as a motor and a torque is input to the sun gear S of the power split device 20, the torque is split into a torque on the carrier C side and a torque on the ring gear R side.

When the second motor generator 62 operates as a motor and a torque is input to the ring gear shaft RA, the torque is transmitted to the automatic transmission 30. When a torque from the driving wheels 69 is input to the second motor generator 62 via the ring gear shaft RA, the second motor generator 62 functions as a generator. Thus, a regenerative braking force can be generated in the vehicle 100.

The automatic transmission 30 includes a first planetary gearing mechanism 30A, a second planetary gearing mechanism 30B, a first clutch C1, a second clutch C2, a first brake mechanism B1, a second brake mechanism B2, and a one-way clutch F1.

The first planetary gearing mechanism 30A includes a sun gear 31, a ring gear 32, pinion gears 33, and a carrier 34. The sun gear 31 is coupled to the ring gear 32 via the pinion gears 33. The carrier 34 supports the pinion gears 33.

The sun gear 31 is coupled to the first brake mechanism B1. An engaged state and a disengaged state of the first brake mechanism B1 are switchable by a pressure of oil supplied to the first brake mechanism B1. Specifically, the first brake mechanism B1 is switched from the disengaged state to the engaged state when the pressure of the oil supplied to the first brake mechanism B1 increases. In the engaged state of the first brake mechanism B1, rotation of the sun gear 31 is braked.

The carrier 34 is coupled to the one-way clutch F1. The one-way clutch F1 restricts rotation of the carrier 34 to one side, and permits rotation of the carrier 34 to the other side. That is, the one-way clutch F1 is switched to a restricting state for restricting the rotation of the carrier 34 or a permitting state for permitting the rotation of the carrier 34. The carrier 34 is coupled to the second brake mechanism B2. Similarly to the first brake mechanism B1, an engaged state and a disengaged state of the second brake mechanism B2 are switchable by a pressure of oil supplied to the second brake mechanism B2. In the engaged state of the second brake mechanism B2, the rotation of the carrier 34 is braked.

The second planetary gearing mechanism 30B includes a sun gear 36, a ring gear 37, pinion gears 38, and a carrier 39. The sun gear 36 is coupled to the ring gear 37 via the pinion gears 38. The carrier 39 supports the pinion gears 38. The carrier 39 is coupled to the output shaft 42.

In the planetary gearing mechanisms structured as described above, the carrier 34 of the first planetary gearing mechanism 30A is coupled to the ring gear 37 of the second planetary gearing mechanism 30B. The ring gear 32 of the first planetary gearing mechanism 30A is coupled to the carrier 39 of the second planetary gearing mechanism 30B.

The sun gear 36 of the second planetary gearing mechanism 30B is coupled to the input shaft 41 via the first clutch C1. An engaged state and a disengaged state of the first clutch C1 are switchable by a pressure of oil supplied to the first clutch C1. Specifically, the first clutch C1 is switched from the disengaged state to the engaged state when the pressure of the oil supplied to the first clutch C1 increases. In the engaged state of the first clutch C1, the sun gear 36 of the second planetary gearing mechanism 30B rotates together with the input shaft 41.

The carrier 34 of the first planetary gearing mechanism 30A is coupled to the input shaft 41 via the second clutch C2. Similarly to the first clutch C1, an engaged state and a disengaged state of the second clutch C2 are switchable by a pressure of oil supplied to the second clutch C2. In the engaged state of the second clutch C2, the carrier 34 of the first planetary gearing mechanism 30A rotates together with the input shaft 41. In this embodiment, the first clutch C1, the second clutch C2, the first brake mechanism B1, and the second brake mechanism B2 are engagement elements.

As illustrated in FIG. 2, gear stages of the automatic transmission 30 are switched based on combinations of the engaged states or the disengaged states of the first clutch C1, the second clutch C2, the first brake mechanism B1, and the second brake mechanism B2 and a combination of the restricting state or the permitting state of the one-way clutch F1. The automatic transmission 30 can make a total of five gear stages including four gear stages that are "first gear" to "fourth gear" for forward traveling and one gear stage that is "R" for reverse traveling.

In FIG. 2, a symbol "○" represents the engaged state of the engagement element such as the first clutch C1, and the restricting state of the one-way clutch F1. A symbol "(○)" represents the engaged state or the disengaged state of the second brake mechanism B2. A blank field represents the disengaged state of the engagement element such as the first clutch C1, and the permitting state of the one-way clutch F1. For example, when the gear stage of the automatic transmission 30 is second gear, the first clutch C1 and the first brake mechanism B1 are engaged, the second clutch C2 and the second brake mechanism B2 are disengaged, and the one-way clutch F1 permits rotation.

As illustrated in FIG. 1, the hydraulic apparatus 65 includes an oil pump 66 and a hydraulic circuit 67 through which oil from the oil pump 66 circulates. The oil pump 66 is a so-called mechanical oil pump configured to operate by receiving a torque of the crankshaft 11. The hydraulic circuit 67 includes a plurality of solenoid valves (not illustrated). By controlling the solenoid valves, the hydraulic circuit 67 adjusts pressures of oil to be supplied to the first clutch C1, the second clutch C2, the first brake mechanism B1, and the second brake mechanism B2. That is, in this embodiment, the engaged states and the disengaged states of the engagement elements such as the first clutch C1 are controlled through the pressures of the oil by controlling the solenoid valves of the hydraulic circuit 67.

As illustrated in FIG. 1, the vehicle 100 includes an accelerator position sensor 72, a vehicle speed sensor 73, an acceleration sensor 74, an indicator 76, and an accelerator pedal 77. The accelerator position sensor 72 detects an accelerator operation amount ACC that is an operation amount of the accelerator pedal 77 operated by a driver. The vehicle speed sensor 73 detects a vehicle speed SP of the vehicle 100. The acceleration sensor 74 detects a vertical acceleration G that is an acceleration in a vertical direction of the vehicle 100. The vertical acceleration G takes a positive value when the acceleration sensor 74 detects an upward acceleration of the vehicle 100, and a negative value when the acceleration sensor 74 detects a downward acceleration of the vehicle 100. The indicator 76 indicates visual information for the driver of the vehicle 100 or the like. Examples of the indicator 76 include a display.

The vehicle 100 includes a controller 90. For example, the controller 90 is mounted in an engine compartment of the vehicle 100 or in an area between a vehicle cabin and the engine compartment. The acceleration sensor 74 is mounted in the controller 90. A signal indicating the accelerator operation amount ACC is input to the controller 90 from the accelerator position sensor 72. A signal indicating the vehicle speed SP is input to the controller 90 from the vehicle speed sensor 73. A signal indicating the vertical acceleration G is input to the controller 90 from the acceleration sensor 74.

The controller 90 includes a central processing unit (CPU) 91, a peripheral circuit 92, a read-only memory (ROM) 93, a storage 94, and a bus 95. The bus 95 communicably connects the CPU 91, the peripheral circuit 92, the ROM 93, and the storage 94. The ROM 93 prestores various programs for causing the CPU 91 to execute various types of control. The storage 94 prestores mapping data 94A. Mapping M1 defined by the mapping data 94A outputs an output variable by inputting input variables. The output variable indicates whether the damper 15 has an abnormality. Details of the mapping M1 are described later. The storage 94 stores, for a predetermined period, data including the accelerator operation amount ACC, the vehicle speed SP, and the vertical acceleration G input to the controller 90. The peripheral circuit 92 includes a circuit configured to generate a clock signal for defining internal operations, a power supply circuit, and a reset circuit.

In this embodiment, the CPU 91 serves as a training device. The storage 94 serves as a storage that stores mapping data. The damper 15 serves as a specific component mounted on the vehicle 100. The specific component is a component on a power transmission path from the internal combustion engine 10 that functions as a drive source of the vehicle 100 to the driving wheels 69.

For example, the CPU 91 controls the internal combustion engine 10, the first motor generator 61, the second motor generator 62, and the automatic transmission 30 by executing various programs stored in the ROM 93. Specifically, the CPU 91 calculates, based on the accelerator operation amount ACC and the vehicle speed SP, requested vehicle power that is a requested value of power necessary for the vehicle 100 to travel. The CPU 91 determines distribution of torques of the internal combustion engine 10, the first motor generator 61, and the second motor generator 62 based on the requested vehicle power. The CPU 91 controls power of the internal combustion engine 10 and power running and regeneration of the first motor generator 61 and the second motor generator 62 based on the distribution of the torques of the internal combustion engine 10, the first motor generator 61, and the second motor generator 62.

The CPU 91 calculates a target gear stage of the automatic transmission 30 based on the vehicle speed SP and the requested vehicle power. The CPU 91 calculates, based on the target gear stage, target pressures that are target values of the pressures of the oil to be supplied to the first clutch C1, the second clutch C2, the first brake mechanism B1, and the second brake mechanism B2. The CPU 91 outputs a control signal Si to the hydraulic apparatus 65 based on the target pressures. Based on the control signal Sl, the hydraulic apparatus 65 changes the pressures of the oil to be supplied to the first clutch C1, the second clutch C2, the first brake mechanism B1, and the second brake mechanism B2. For example, when the gear stage of the automatic transmission 30 before shifting is second gear, the first clutch C1 and the first brake mechanism B1 are engaged, the second clutch C2 and the second brake mechanism B2 are disengaged, and the one-way clutch F1 permits rotation as illustrated in FIG. 2. When the target gear stage of the automatic transmission 30 is set to third gear, the disengaged second clutch C2 is engaged by gradually increasing the pressure of the oil supplied from the hydraulic apparatus 65 to the second clutch C2 in response to the control signal Si based on the target pressure of the second clutch C2. Further, the engaged first brake mechanism B1 is disengaged by gradually reducing the pressure of the oil supplied from the hydraulic apparatus 65 to the first brake mechanism B1 in response to the control signal Si based on the target pressure of the first brake mechanism B1. As a result, the gear stage of the automatic transmission 30 is shifted from second gear to third gear.

Next, description is given of determination control to be executed by the CPU 91 to determine whether the damper 15 has an abnormality. The ROM 93 prestores a determination program for executing the determination control. While the controller 90 is active, the CPU 91 repeatedly executes the determination control by executing the determination program stored in the ROM 93.

Figure 3:
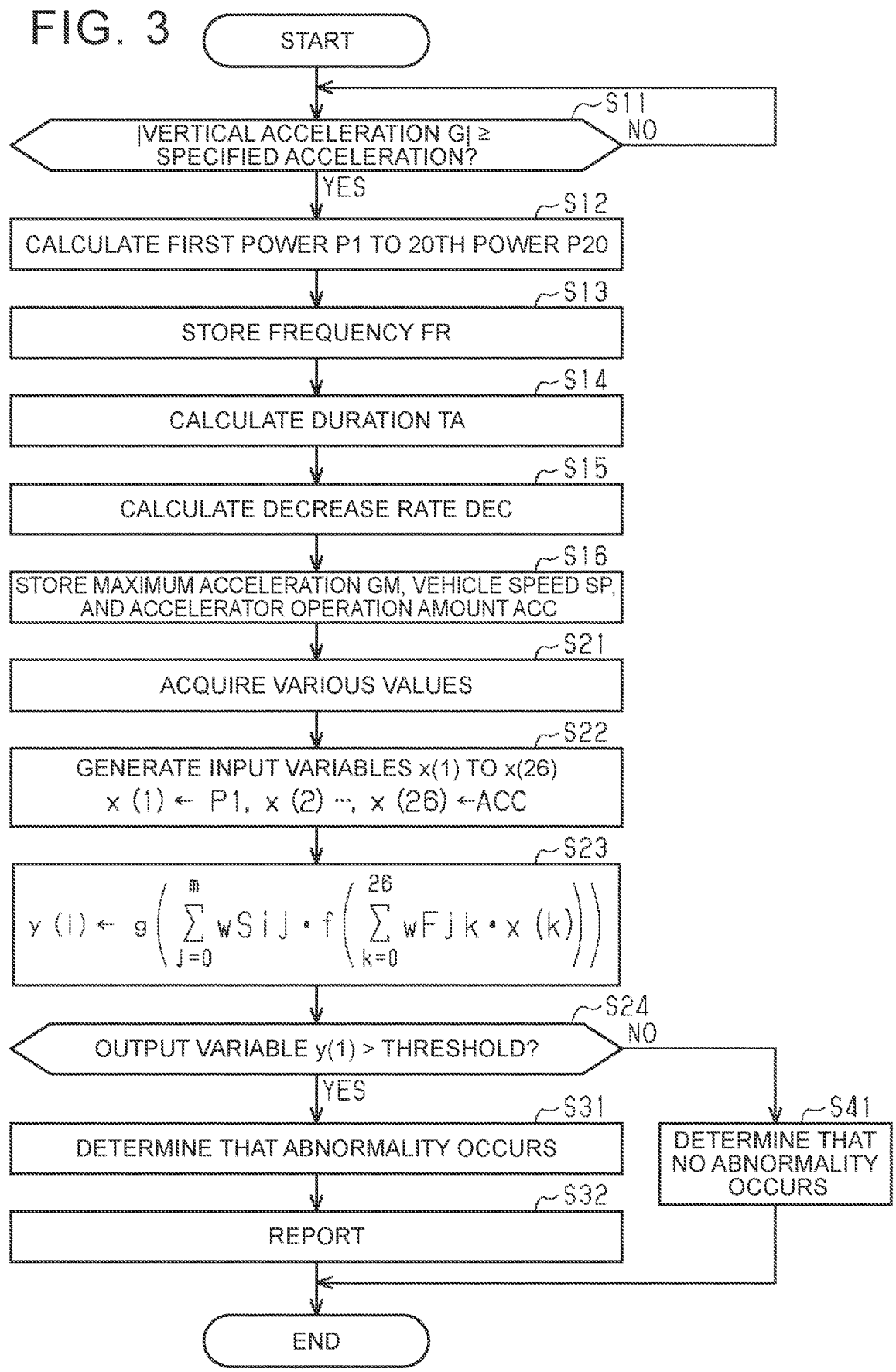
FIG. 3 is a flowchart illustrating determination control.

When the determination control is started, the CPU 91 executes a process of Step S11 as illustrated in FIG. 3. In Step S11, the CPU 91 determines whether an absolute value of the vertical acceleration G is equal to or higher than a predetermined specified acceleration. For example, the specified acceleration is preset through experiments as a value perceivable by humans at a driver's seat of the vehicle 100. When the CPU 91 determines in Step S11 that the absolute value of the vertical acceleration G is lower than the specified acceleration (S11: NO), the CPU 91 repeats the process of Step S11. When the CPU 91 determines in Step S11 that the absolute value of the vertical acceleration G is equal to or higher than the specified acceleration (S11: YES), the CPU 91 advances the process to Step S12.

Figure 4:
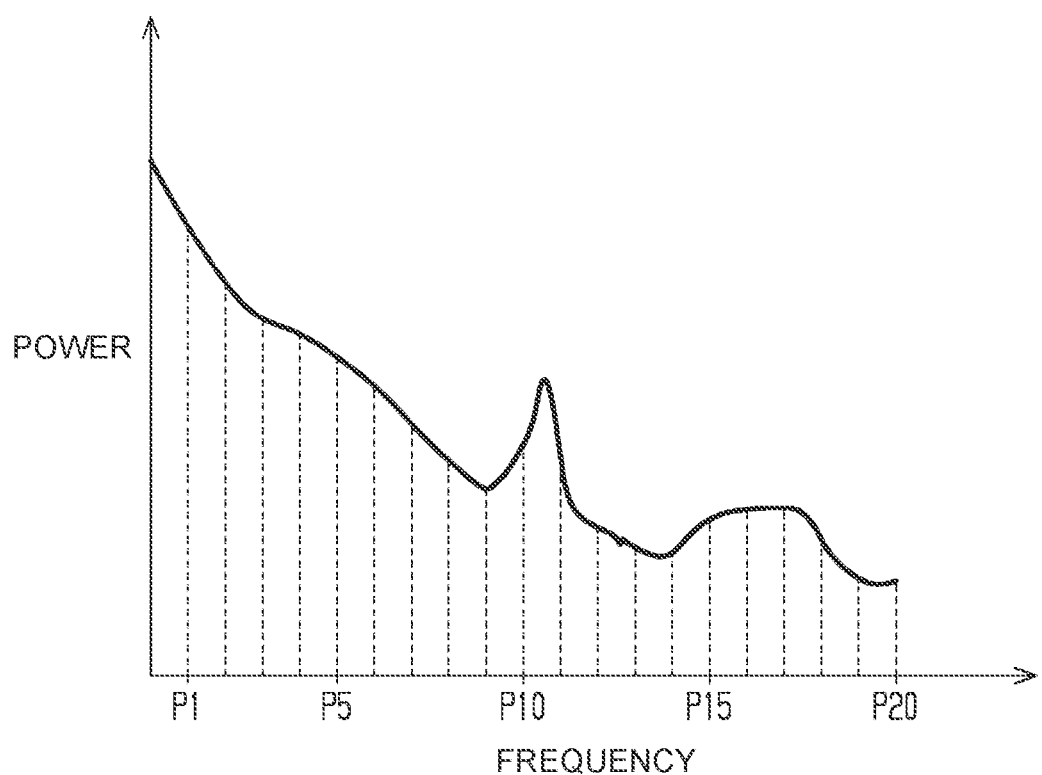
FIG. 4 is an explanatory drawing illustrating a power spectrum.

In Step S12, the CPU 91 acquires a transition of the vertical acceleration G in a predetermined period from the timing of the process of Step S11. For example, the predetermined period is several seconds. As illustrated in FIG. 4, the CPU 91 executes fast Fourier transform on the transition of the vertical acceleration G in the predetermined period to create a so-called power spectrum, which is a graph showing vibration energy of the vehicle 100 on a unit frequency basis. The CPU 91 calculates, from the vibration power spectrum, a total of 20 powers associated with a predetermined first frequency to a predetermined 20th frequency as a first power P1 to a 20th power P20 in order from the first frequency. The CPU 91 stores the calculated first power P1 to the calculated 20th power P20 in the storage 94. In this embodiment, the first frequency to the 20th frequency are set by dividing a predetermined frequency band perceivable by humans as vibration into 20 equal parts. For example, when a frequency band of less than 20 Hz is set as the frequency band perceivable by humans as vibration, the first frequency to the 20th frequency are set to 1 Hz, 2 Hz . . . in this order. Then, the CPU 91 advances the process to Step S13 as illustrated in FIG. 3.

In Step S13, the CPU 91 selects a maximum power from among the first power P1 to the 20th power P20. The CPU 91 acquires a frequency associated with the maximum power as a frequency FR. For example, if the maximum power is the first power P1 as illustrated in FIG. 4, the frequency FR is 1 Hz. For example, if the maximum power is the 10th power, the frequency FR is 10 Hz. The CPU 91 stores the acquired frequency FR in the storage 94. The power spectrum has a dimension corresponding to a square of an amplitude. The frequency FR at which the power spectrum shows the maximum power is a frequency at a maximum amplitude of vibration of the vehicle 100. Then, the CPU 91 advances the process to Step S14 as illustrated in FIG. 3.

In Step S14 of FIG. 3, the CPU 91 calculates a duration TA of vibration at the frequency FR. Specifically, the CPU 91 executes band-pass filtering to extract a maximum-amplitude frequency component, that is, a component of the frequency FR acquired in Step S13 from the transition of the vertical acceleration G in the predetermined period that is acquired in Step S12. For example, if the frequency FR is 1 Hz, a component of 0 to 1 Hz is extracted from the transition of the vertical acceleration G. For example, if the frequency FR is 10 Hz, a component of 9 to 10 Hz is extracted from the transition of the vertical acceleration G. The CPU 91 determines a local maximum value and a local minimum value of the vertical acceleration G based on the maximum-amplitude frequency component of the vertical acceleration G. The local maximum value of the vertical acceleration G is a point on the transition of the vertical acceleration G where the vertical acceleration G turns from increase to decrease. The local minimum value of the vertical acceleration G is a point on the transition of the vertical acceleration G where the vertical acceleration G turns from decrease to increase. The CPU 91 calculates, as an amplitude AM, a value obtained by subtracting, from the determined local maximum value, a local minimum value appearing next to the local maximum value. The CPU 91 calculates the amplitude AM for each of a plurality of local maximum values.

The CPU 91 determines a timing when the amplitude AM turns from a value smaller than a predetermined specified amplitude to a value equal to or larger than the specified amplitude in the maximum-amplitude frequency component of the vertical acceleration G. The CPU 91 also determines a timing when the amplitude AM turns from the value equal to or larger than the specified amplitude to a value smaller than the specified amplitude after turning to the value equal to or larger than the specified amplitude. The CPU 91 sets the duration TA of the vibration to a period from the timing when the amplitude AM turns to the value equal to or larger than the specified amplitude to the timing when the amplitude AM turns to the value smaller than the specified amplitude.

When the amplitude AM turns to a value equal to or larger than the specified amplitude, turns to a value smaller than the specified amplitude, and turns again to a value equal to or larger than the specified amplitude in the predetermined period, a plurality of periods of vibration may be calculated. In this case, the CPU 91 sets the longest period as the duration TA. There is also such a case that the amplitude AM turns to a value equal to or larger than the specified amplitude but does not turn to a value smaller than the specified amplitude in the predetermined period. In this case, the CPU 91 calculates the duration TA under the assumption that the amplitude AM turns to a value smaller than the specified amplitude at the end of the predetermined period. The CPU 91 stores the calculated duration TA in the storage 94. Then, the CPU 91 advances the process to Step S15.

In Step S15, the CPU 91 calculates a decrease rate DEC of the vibration per unit time at the frequency FR. Specifically, the CPU 91 subtracts an amplitude AM at the end of the duration TA from an amplitude AM at the start of the duration TA. The CPU 91 calculates the decrease rate DEC by dividing the value obtained through the subtraction by the duration TA. The CPU 91 stores the calculated decrease rate DEC in the storage 94. Then, the CPU 91 advances the process to Step S16.

In Step S16, the CPU 91 acquires, as a maximum acceleration GM, a maximum value of the absolute value of the vertical acceleration G acquired in the predetermined period. The CPU 91 acquires a vehicle speed SP at the timing of acquisition of the maximum acceleration GM in the predetermined period. The CPU 91 acquires an accelerator operation amount ACC at the timing of acquisition of the maximum acceleration GM in the predetermined period. The CPU 91 stores the acquired values in the storage 94. Then, the CPU 91 advances the process to Step S21.

In Step S21, the CPU 91 acquires various values by accessing the storage 94. Specifically, the CPU 91 acquires the first power P1 to the 20th power P20, the maximum acceleration GM, the frequency FR, the duration TA, the decrease rate DEC, the vehicle speed SP, and the accelerator operation amount ACC. Then, the CPU 91 advances the process to Step S22.

In Step S22, the CPU 91 generates the various values acquired in the process of Step S21 as an input variable $x(1)$ to an input variable $x(26)$ of the mapping M1 for determining whether the damper 15 has an abnormality.

The CPU 91 substitutes the first power P1 to the 20th power P20 for the input variable $x(1)$ to the input variable $x(20)$. Specifically, the CPU 91 substitutes the first power P1 for the input variable $x(1)$, the second power P2 for the input variable $x(2)$, . . . , respectively.

The CPU 91 substitutes the maximum acceleration GM for the input variable $x(21)$. The CPU 91 substitutes the frequency FR for the input variable $x(22)$. The CPU 91 substitutes the duration TA for the input variable $x(23)$. The CPU 91 substitutes the decrease rate DEC for the input variable $x(24)$. The CPU 91 substitutes the vehicle speed SP for the input variable $x(25)$. The CPU 91 substitutes the accelerator operation amount ACC for the input variable $x(26)$. Then, the CPU 91 advances the process to Step S23.

In Step S23, the CPU 91 calculates a value of an output variable $y(i)$ by inputting the input variable $x(1)$ to the input variable $x(26)$ generated in the process of Step S22 and an input variable $x(0)$ serving as a bias parameter to the mapping M1 defined by the mapping data 94A prestored in the storage 94. Then, the CPU 91 advances the process to Step S24.

Examples of the mapping M1 defined by the mapping data 94A include a function approximate device that is a fully connected feedforward neural network having one intermediate layer. Specifically, in the mapping M1 defined by the mapping data 94A, values of nodes in the intermediate layer are determined such that the input variables $x(1)$ to $x(26)$ and the input variable $x(0)$ serving as the bias parameter are converted by linear mapping defined by a coefficient wFjk ($j=1$ to m, $k=0$ to 26), and "m" values obtained through the conversion are substituted into an activation function f. Further, an output variable $y(1)$ is determined such that the values of the nodes in the intermediate layer are converted by linear mapping defined by a coefficient wSij ($i=1$), and individual values obtained through the conversion are substituted into an activation function g. The output variable $y(1)$ indicates a possibility that the damper 15 has an abnormality, and changes as, for example, a numerical value between "0" to "1". As the output variable $y(1)$ increases, the possibility of the abnormality of the damper 15 increases. The output variable $y(1)$ is an abnormality determination variable. Examples of the activation function f of this embodiment include a rectified linear unit (ReLU) function. Examples of the activation function g include a sigmoid function. A method for training the mapping M1 is described later.

In Step S24, the CPU 91 determines whether the output variable $y(1)$ is larger than a predetermined threshold. For example, the threshold is "0.5". When the CPU 91 determines in Step S24 that the output variable $y(1)$ is larger than the threshold (S24: YES), the CPU 91 advances the process to Step S31.

In Step S31, the CPU 91 determines that the damper 15 has an abnormality. Then, the CPU 91 advances the process to Step S32. In Step S32, the CPU 91 outputs, to the indicator 76, a signal for causing the indicator 76 to indicate that the damper 15 has an abnormality. Then, the CPU 91 terminates the current determination control.

When the CPU 91 determines that the output variable $y(1)$ is equal to or smaller than the threshold (S24: NO), the CPU 91 advances the process to Step S41. In Step S41, the CPU 91 determines that the damper 15 has no abnormality. Then, the CPU 91 terminates the current determination control.

Figure 6:
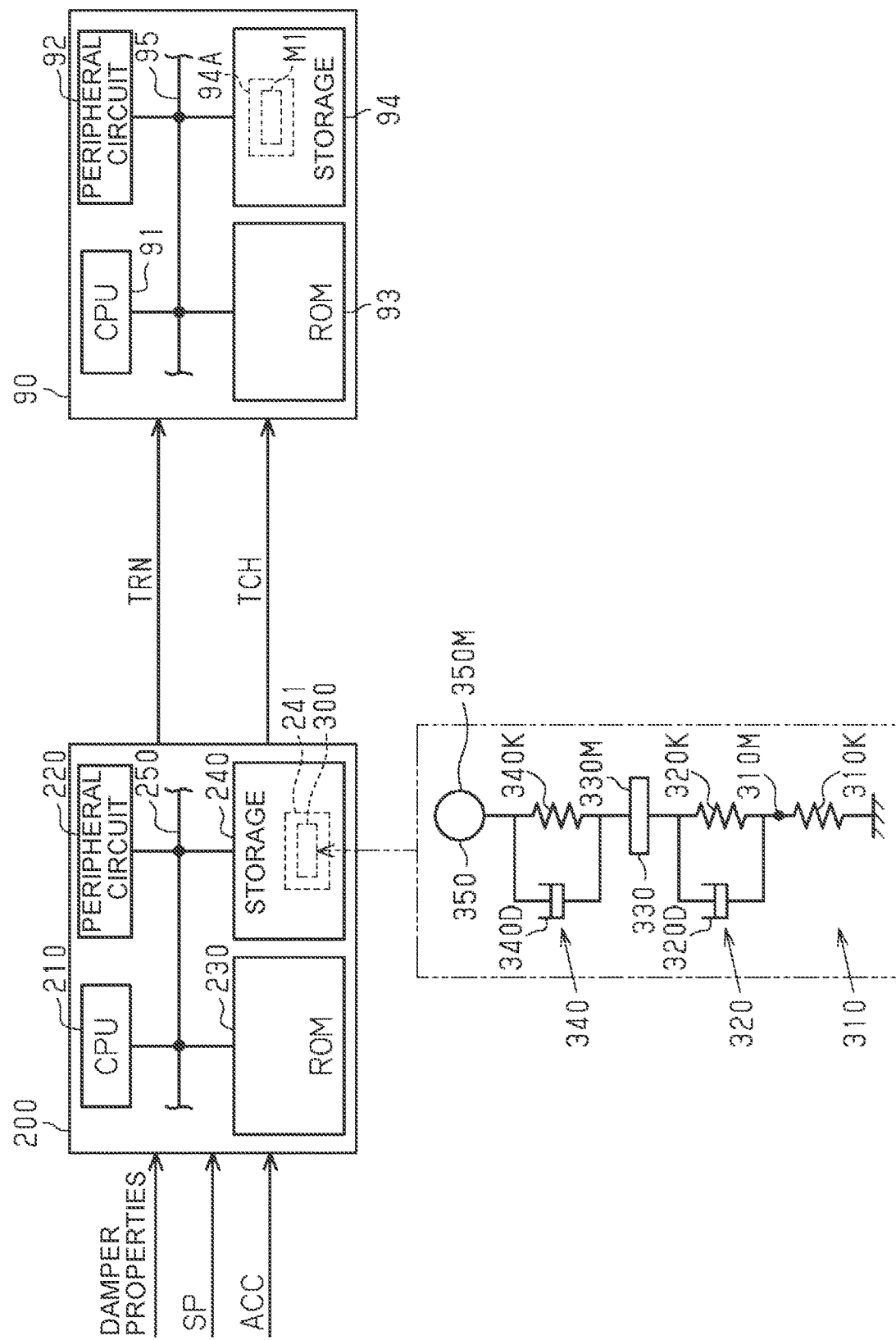
FIG. 6 is a structural diagram of a simulator.

Next, description is given of the method for training the mapping M1 defined by the mapping data 94A. First, description is given of a simulator 200 to be used for training the mapping M1. As illustrated in FIG. 6, the simulator 200 includes a CPU 210, a peripheral circuit 220, a ROM 230, a storage 240, and a bus 250. Although illustration is omitted, the simulator 200 is communicable with the controller 90 through a removal external cable. The bus 250 communicably connects the CPU 210, the peripheral circuit 220, the ROM 230, and the storage 240. The ROM 230 prestores various programs for causing the CPU 210 to execute various processes. The peripheral circuit 220 includes a circuit configured to generate a clock signal for defining internal operations, a power supply circuit, and a reset circuit. The storage 240 stores model data 241 for simulating vibration of the vehicle 100. The model data 241 defines a vehicle model 300, which is a model of the structure of the vehicle 100.

The vehicle model 300 defines a driving wheel 310, a suspension 320, a frame 330, a mount 340, and a drive system 350. The frame 330 is assumed to be a skeletal component that supports components mounted on the vehicle 100.

In the vehicle model 300, the frame 330 is in contact with a road via the suspension 320 and the driving wheel 310. Therefore, vibration of the frame 330 supported on the road via the driving wheel 310 and the suspension 320 can be calculated based on a coupled dynamical model including a spring rate 310K and a mass 310M of the driving wheel 310 and a spring rate 320K and a damping coefficient 320D of the suspension 320. In the vehicle model 300, the spring rate 310K and the mass 310M of the driving wheel 310 are set equal to respective design values in the vehicle 100. In the vehicle model 300, the spring rate 320K and the damping coefficient 320D of the suspension 320 are set equal to respective design values in the vehicle 100. In this embodiment, the spring rate 310K, the mass 310M, the spring rate 320K, and the damping coefficient 320D are fixed values and do not change.

In the vehicle model 300, the frame 330 supports the drive system 350 via the mount 340. Therefore, vibration transmitted from the drive system 350 to the frame 330 can be calculated based on a coupled dynamical model including a spring rate 340K and a damping property 340D of the mount 340 and a mass 350M of the drive system 350. In the vehicle model 300, the spring rate 340K and the damping property 340D of the mount 340 are set equal to respective design values in the vehicle 100. In the vehicle model 300, the mass 350M of the drive system 350 is set equal to its design value in the vehicle 100. The drive system 350 is a single object serving as a vibration source assuming the individual apparatuses ranging from the internal combustion engine 10 to the automatic transmission 30 in the actual vehicle 100. In this embodiment, the spring rate 340K, the damping property 340D, and the mass 350M are fixed values and do not change.

A plurality of condition parameters related to conditions of the vehicle 100 can be input to the model data 241. In this embodiment, the condition parameters are a rigidity value K of a damper, a hysteresis value H of the damper, a gap value GA of the damper, the vehicle speed SP, and the accelerator operation amount ACC. In the model data 241, the damper is assumed to be the damper 15 of the vehicle 100.

Figure 5:
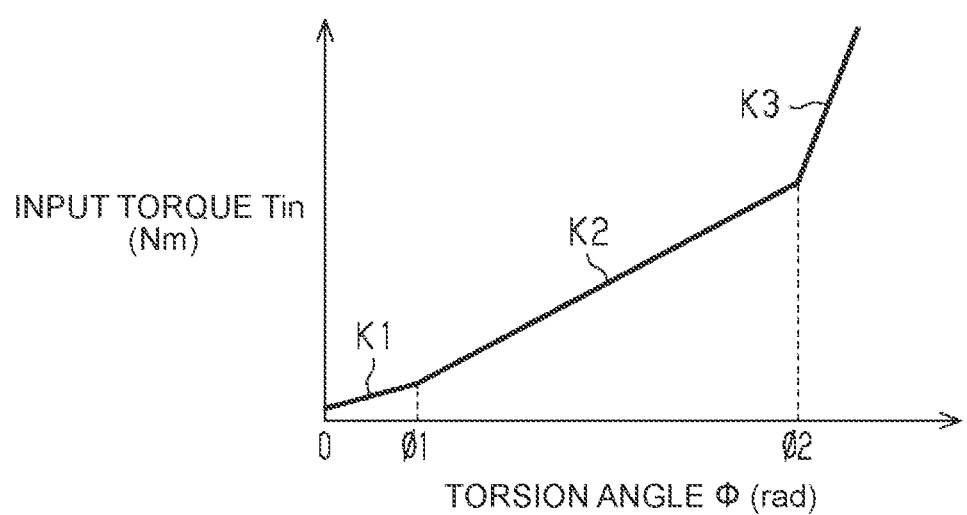
FIG. 5 is an explanatory drawing illustrating a rigidity value of a damper.

The rigidity value K of the damper is represented by an input torque Tin necessary to cause a unit torsion angle in the damper 15. When a relationship between a torsion angle Φ and the input torque Tin is represented by a Cartesian coordinate system as illustrated in FIG. 5, the rigidity value K corresponds to a derivative, that is, an inclination of a line indicating the relationship between the torsion angle Φ and the input torque Tin. The torsion angle Φ is a difference between an angular position of an input shaft of the damper 15 and an angular position of an output shaft of the damper 15.

In the damper 15 of the vehicle 100 assumed in the model data 241, the rigidity value K changes within a normal range from a first value K1 to a third value K3 depending on the torsion angle θ. Specifically, when the torsion angle Φ is equal to or larger than "0" and smaller than a first specified value Φ1, the rigidity value K is the first value K1 as illustrated in FIG. 5. When the torsion angle Φ is equal to or larger than the first specified value Φ 1 and smaller than a second specified value Φ2, the rigidity value K is the second value K2 larger than the first value K1. When the torsion angle Φ is equal to or larger than the second specified value Φ2, the rigidity value K is the third value K3 larger than the second value K2.

In the damper 15 of the vehicle 100, the rigidity value K may fall out of the normal range due to a change over time. Examples of the change over time include a change in the property of a material for a component of the damper 15 due to a fine crack in the component of the damper 15 or repetitive exposure to temperature change. In the model data 241, arbitrary values including values outside the normal range can be input as the rigidity value K.

The hysteresis value H of the damper is an absolute value of a difference between an input torque Tin necessary to cause a predetermined torsion angle Φ by increasing the input torque Tin to the damper 15 and an input torque Tin necessary to cause the predetermined torsion angle Φ by reducing the input torque Tin to the damper 15.

In the damper 15 of the vehicle 100 assumed in the model data 241, the necessary input torque Tin is larger when causing the predetermined torsion angle Φ by increasing the input torque Tin to the damper 15. In the damper 15, the hysteresis value H is approximately a constant value H1 irrespective of the value of the torsion angle Φ. However, the hysteresis value H may change to some degree due to an external environment such as temperature or manufacturing variations of the damper 15. In consideration of this change, the normal range of the hysteresis value H of the damper 15 is, for example, a range of ±5% of the constant value H1.

The hysteresis value H of the damper may fall out of the normal value range due to a change over time similarly to the rigidity value K. In the model data 241, arbitrary values including values outside the normal range can be input as the hysteresis value H.

The gap value GA of the damper is a rotation angle of the input shaft of the damper 15 that is required to start rotation of the output shaft of the damper 15 when the input shaft is rotated in a state in which the torsion angle Φ of the damper 15 is "0". That is, the gap value GA of the damper reflects a clearance in a rotational direction between an element on the input shaft side of the damper 15 and an element on the output shaft side of the damper 15. This clearance may be referred to as "play" or "backlash".

In the damper 15 of the vehicle 100 assumed in the model data 241, dimensional values of the components of the damper 15 are preset. Therefore, the gap value GA is a constant value GA1. However, the gap value GA may change to some degree due to an external environment such as temperature or manufacturing variations of the damper 15. In consideration of this change, the normal range of the gap value GA of the damper 15 is, for example, a range of ±1% of the constant value GA1.

The gap value GA of the damper may fall out of the normal value range due to a change over time. In particular, the components of the damper 15 may be worn out or partially chipped along with use. Therefore, the gap value GA of the damper may fall out of the normal value range. In the model data 241, arbitrary values including values outside the normal range can be input as the gap value GA.

In the vehicle 100 assumed in the model data 241, a value to be generated as the vehicle speed SP has a limit. Further, the stroke of the accelerator pedal 77 has a limit. Therefore, a value to be generated as the accelerator operation amount ACC has a limit. In the model data 241, arbitrary values within a predetermined vehicle speed range can be input as the vehicle speed SP. In the model data 241, arbitrary values within a predetermined operation amount range can be input as the accelerator operation amount ACC.

When the rigidity value K of the damper, the hysteresis value H of the damper, the gap value GA of the damper, the vehicle speed SP, and the accelerator operation amount ACC are input to the model data 241, the CPU 210 of the simulator 200 outputs characteristic variables related to vibration of the vehicle 100 by using the vehicle model 300. A set of the condition parameters, that is, the rigidity value K of the damper, the hysteresis value H of the damper, the gap value GA of the damper, the vehicle speed SP, and the accelerator operation amount ACC that are input to the model data 241 is hereinafter referred to as "parameter set". The rigidity value K of the damper, the hysteresis value H of the damper, and the gap value GA of the damper that are input to the model data 241 are specific parameters indicating properties of the specific component.

In the vehicle 100 assumed in the model data 241, vibration occurring in the internal combustion engine 10 and the automatic transmission 30 can be estimated based on the vehicle speed SP and the accelerator operation amount ACC. Further, the input torque Tin of the damper 15 can be estimated based on the vehicle speed SP and the accelerator operation amount ACC. Vibration occurring in the damper 15 can be estimated based on the input torque Tin, the rigidity value K of the damper, the hysteresis value H of the damper, and the gap value GA of the damper. The CPU 210 applies the vibration occurring in the internal combustion engine 10, the automatic transmission 30, and the damper 15 to the vehicle model 300 as vibration of the drive system 350. The CPU 210 estimates, based on the values of the spring rates and the masses set in the vehicle model 300, a transition of vibration of the frame 330 in a predetermined period as the transition of the vertical acceleration G of the vehicle 100.

The CPU 210 creates a power spectrum based on the estimated transition of the vertical acceleration G, and calculates a first power P1 to a 20th power P20 associated with the first frequency to the 20th frequency. The CPU 210 acquires, as a frequency FR, a frequency associated with a maximum power among the first power P1 to the 20th power P20. The CPU 210 calculates a duration TA and a decrease rate DEC of vibration based on the estimated transition of the vertical acceleration G. The CPU 210 acquires, as a maximum acceleration GM, a maximum value of an absolute value of the vertical acceleration G acquired in the predetermined period. Details of the methods for calculating the first power P1 to the 20th power P20, the frequency FR, the duration TA, the decrease rate DEC, and the maximum acceleration GM by the CPU 210 are the same as the details of the methods for calculating the individual values by the CPU 91. Therefore, description of the methods is omitted.

Next, description is given of training control for training the mapping M1 defined by the mapping data 94A of the controller 90. In the following description, the simulator 200 and the controller 90 are connected by the external cable and communicable with each other.

For example, when an operator gives an instruction to execute the training control, the CPU 210 executes the training control. The ROM 230 prestores a training program for executing the training control. The CPU 210 executes the training control by executing the training program stored in the ROM 230.

Figure 7:
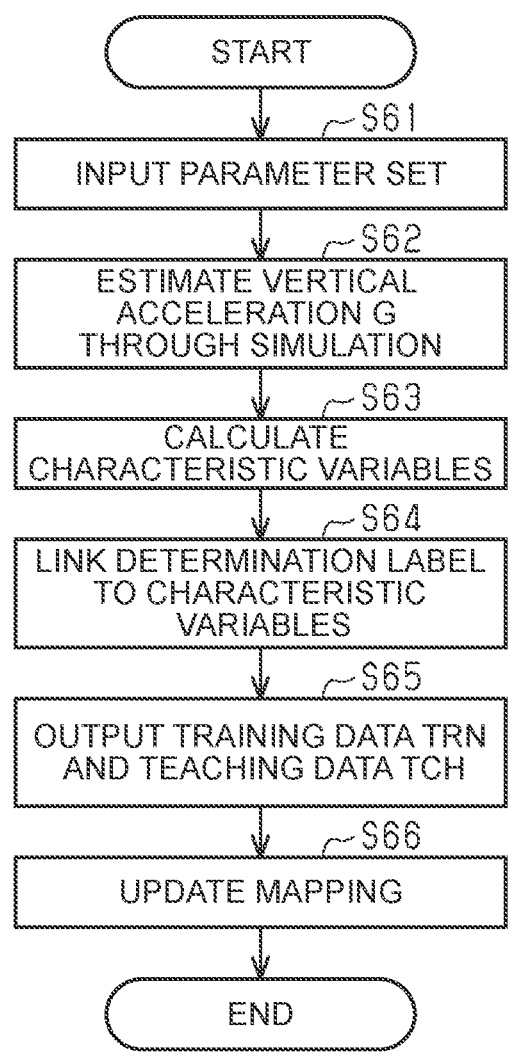
FIG. 7 is a flowchart illustrating training control.

When the training control is started, a parameter set is input to the CPU 210 in Step S61 of FIG. 7. In this embodiment, the operator inputs numerical values of parameters by operating an input device connected to the simulator 200. When the numerical values of all the parameters are input, a set of the parameters is input to the CPU 210 as the parameter set. Then, the CPU 210 advances the process to Step S62.

In Step S62, the CPU 210 estimates vibration of the frame 330 of the vehicle model 300 as the transition of the vertical acceleration G of the vehicle 100 through simulation using the vehicle model 300 defined by the model data 241 in the storage 240. Then, the CPU 91 advances the process to Step S63.

In Step S63, the CPU 210 calculates characteristic variables based on the transition of the vertical acceleration G that is calculated in the process of Step S62. In this embodiment, the CPU 210 calculates a first power P1 to a 20th power P20, a maximum acceleration GM, a frequency FR, a duration TA, and a decrease rate DEC as the characteristic variables related to vibration of the vehicle 100. In this embodiment, the processes of Step S61 to Step S63 correspond to a simulation step. Then, the CPU 210 advances the process to Step S64.

In Step S64, the CPU 210 links a determination label LA to the characteristic variables calculated in the process of Step S63 based on the values of the condition parameters in the parameter set input in Step S61. The determination label LA indicates whether the damper 15 has an abnormality. Specifically, the CPU 210 determines whether the following conditions are satisfied. The first condition is that the rigidity value K of the damper falls out of the predetermined normal range. The second condition is that the hysteresis value H of the damper falls out of the predetermined normal range. The third condition is that the gap value GA of the damper falls out of the predetermined normal range. When at least one of the three conditions is satisfied, the CPU 210 sets the determination label LA to, for example, a numerical value "1" indicating that the damper 15 has an abnormality. When none of the three conditions is satisfied, the CPU 210 sets the determination label LA to, for example, a numerical value "0" indicating that the damper 15 has no abnormality. In this embodiment, the determination label LA is the same type of variable as that of the abnormality determination variable, and can be set within a range of 0 to 1 similarly to the abnormality determination variable in the process of Step S23. Then, the CPU 210 advances the process to Step S65.

In Step S65, the CPU 210 collects, into training data TRN, the characteristic variables calculated in Step S63 and the vehicle speed SP and the accelerator operation amount ACC in the parameter set input when the characteristic variables are calculated. The CPU 210 sets, as teaching data TCH, the determination label LA associated with the characteristic variables. As illustrated in FIG. 6, the CPU 210 outputs a set of the training data TRN and the teaching data TCH to the controller 90.

When the training data TRN and the teaching data TCH are input, the controller 90 executes a process of Step S66. In Step S66, the CPU 91 of the controller 90 updates the mapping M1 of the mapping data 94A in the storage 94 based on the input training data TRN and the input teaching data TCH.

Specifically, the CPU 91 of the controller 90 sets the numerical values of the input training data TRN, that is, the first power P1 to the 20th power P20, the maximum acceleration GM, the frequency FR, the duration TA, the decrease rate DEC, the vehicle speed SP, and the accelerator operation amount ACC as the input variable x(1) to the input variable x(26). Then, the CPU 91 updates the mapping M1 by setting, as an output variable y(1), the determination label LA that is the teaching data TCH paired with the training data TRN. In this embodiment, the processes of Step S65 and Step S66 correspond to a training step. Then, the CPU 210 terminates the current training control.

Actions of this embodiment are described. When the parameter set is input to the model data 241 of the simulator 200, at least one of the condition parameters in the parameter set is set to a value outside the normal range, and the other condition parameters are set to values within the normal ranges. For example, the gap value GA of the damper 15 among the condition parameters is set outside the normal range, and the other condition parameters are set to values within the normal ranges. Therefore, the simulator 200 outputs characteristic variables under the assumption that the gap value GA is an abnormal value because the components of the damper 15 are worn out. When the parameter set is input to the model data 241, all the condition parameters in the parameter set are set to values within the normal ranges. At this time, at least one of the condition parameters is set to a value that falls within the normal range but is close to a boundary between the normal range and the abnormal range. Therefore, the simulator 200 outputs characteristic variables under the assumption that the damper 15 is near the boundary between the normal state and the abnormal state. By inputting an arbitrary parameter set to the simulator 200 as described above, various characteristic variables are obtained assuming a state of the damper 15 that is desired by the operator.

Effects of this embodiment are described.

(1) According to the embodiment described above, the characteristic variables under the assumption that the damper 15 has an abnormality can be obtained such that the operator inputs the parameter set to the simulator 200. A large number of characteristic variables can be obtained by changing the values of the condition parameters in the parameter set as appropriate. Therefore, characteristic variables variously assuming, for example, the abnormality levels of the damper 15 can be obtained even if the abnormality of the damper 15 occurs at a low frequency to provide only a few opportunities to obtain characteristic variables in the event of actual abnormalities of the damper 15. The mapping M1 is updated by using the obtained characteristic variables as the training data TRN, thereby increasing a probability that the mapping M1 can output an appropriate output variable.

(2) According to the embodiment described above, the value that falls within the normal range but is close to the boundary between the normal range and the abnormal range is input to the simulator 200 as the condition parameter. Therefore, it is possible to obtain characteristic variables under the assumption that the damper 15 is becoming abnormal. The characteristic variables when the damper 15 is near the boundary between the normal state and the abnormal state are very important from the viewpoint of improving the accuracy of the output variable of the mapping M1. When the damper 15 remains in the normal range but is becoming abnormal, there is a low possibility that a problem such as vibration emerges, thereby reducing opportunities to acquire data. In the embodiment described above, it is possible to easily obtain the characteristic variables that are hardly acquired as data but are important for the update of the mapping M1.

(3) In the embodiment described above, the damper 15 is an abnormality determination target component for the mapping M1 among the components on the power transmission path from the internal combustion engine 10 to the driving wheels 69. The damper 15 has components such as the damper body 16 and the attenuator 17, which may be related to vibration of the vehicle 100. Further, the damper 15 receives a relatively large torque from the internal combustion engine 10. It is particularly appropriate to improve the accuracy of the output variable of the mapping M1 by using the simulator 200 for the damper 15.

(4) In the embodiment described above, the condition parameters include the specific parameter such as the rigidity value K indicating the property of the damper 15. The specific parameter indicating the property of the damper 15 has the normal range preset when input to the simulator 200. Thus, the abnormal state of the damper 15 can securely be reflected by inputting a value outside the normal range to the simulator 200 as the specific parameter indicating the property of the damper 15.

(5) In the embodiment described above, the damper 15 has the damper body 16 and the attenuator 17 having elastic members. Therefore, when the damper 15 has an abnormality, there is a strong possibility that the vibration of the vehicle 100 increases. That is, there is a strong possibility that the presence or absence of the abnormality of the damper 15 is related to the magnitude of the vibration of the vehicle 100. In the embodiment described above, the simulator 200 outputs, as the characteristic variable, the maximum acceleration GM that reflects the magnitude of the vibration of the vehicle 100, and the mapping M1 is updated based on the maximum acceleration GM. When the damper 15 has an abnormality, not only the magnitude of the vibration of the vehicle 100 but also a frequency characteristic of the vibration may change. In the embodiment described above, the simulator 200 outputs, as the first power P1 to the 20th power P20, the power spectrum that reflects the frequency characteristic of the vibration, and the mapping M1 is updated based on the power spectrum. The training effect of the mapping M1 using the simulator 200 is increased by updating the mapping M1 by using the parameters related to the presence or absence of the abnormality of the damper 15.

(6) The damper body 16 of the damper 15 has the elastic member. When the elastic member has an abnormality, the resonance frequency of the damper 15 changes, thereby increasing a possibility of a change in the frequency FR at the maximum amplitude of the vibration caused by the damper 15. In the embodiment described above, the simulator 200 outputs, as the characteristic variable, the frequency FR particularly related to the abnormality of the damper body 16, and the mapping M1 is updated based on the frequency FR. The training effect of the mapping M1 is increased particularly about the presence or absence of the abnormality of the damper body 16.

(7) The damper 15 has the attenuator 17. When the attenuator 17 has an abnormality, there is a strong possibility of a change in the duration TA and the decrease rate DEC of the vibration of the damper 15. In the embodiment described above, the simulator 200 outputs, as the characteristic variables, the duration TA and the decrease rate DEC particularly related to the abnormality of the attenuator 17, and the mapping M1 is updated based on the duration TA and the decrease rate DEC. The training effect of the mapping M1 is increased particularly about the presence or absence of the abnormality of the attenuator 17.

(8) In the embodiment described above, the rotation speeds of the input shaft and the output shaft of the damper 15 change when the vehicle speed SP changes. Even in the same state of the damper 15, the vibration caused by the damper 15 may vary depending on the magnitude of the vehicle speed SP. In the embodiment described above, the vehicle speed SP is employed as one of the condition parameters to be input to the model data 241, and the simulator 200 calculates the characteristic variables based on the vehicle speed SP. Thus, there is a greater expectation that the simulator 200 outputs accurate characteristic variables.

(9) In the embodiment described above, when the accelerator operation amount ACC changes, the load on the internal combustion engine 10 changes and the torque input to the damper 15 changes as well. Even in the same state of the damper 15, the vibration caused by the damper 15 may vary depending on the magnitude of the accelerator operation amount ACC. In the embodiment described above, the accelerator operation amount ACC is employed as one of the condition parameters to be input to the model data 241, and the simulator 200 calculates the characteristic variables based on the accelerator operation amount ACC. Thus, there is a greater expectation that the simulator 200 outputs accurate characteristic variables.

OTHER EMBODIMENTS

Figure 8:
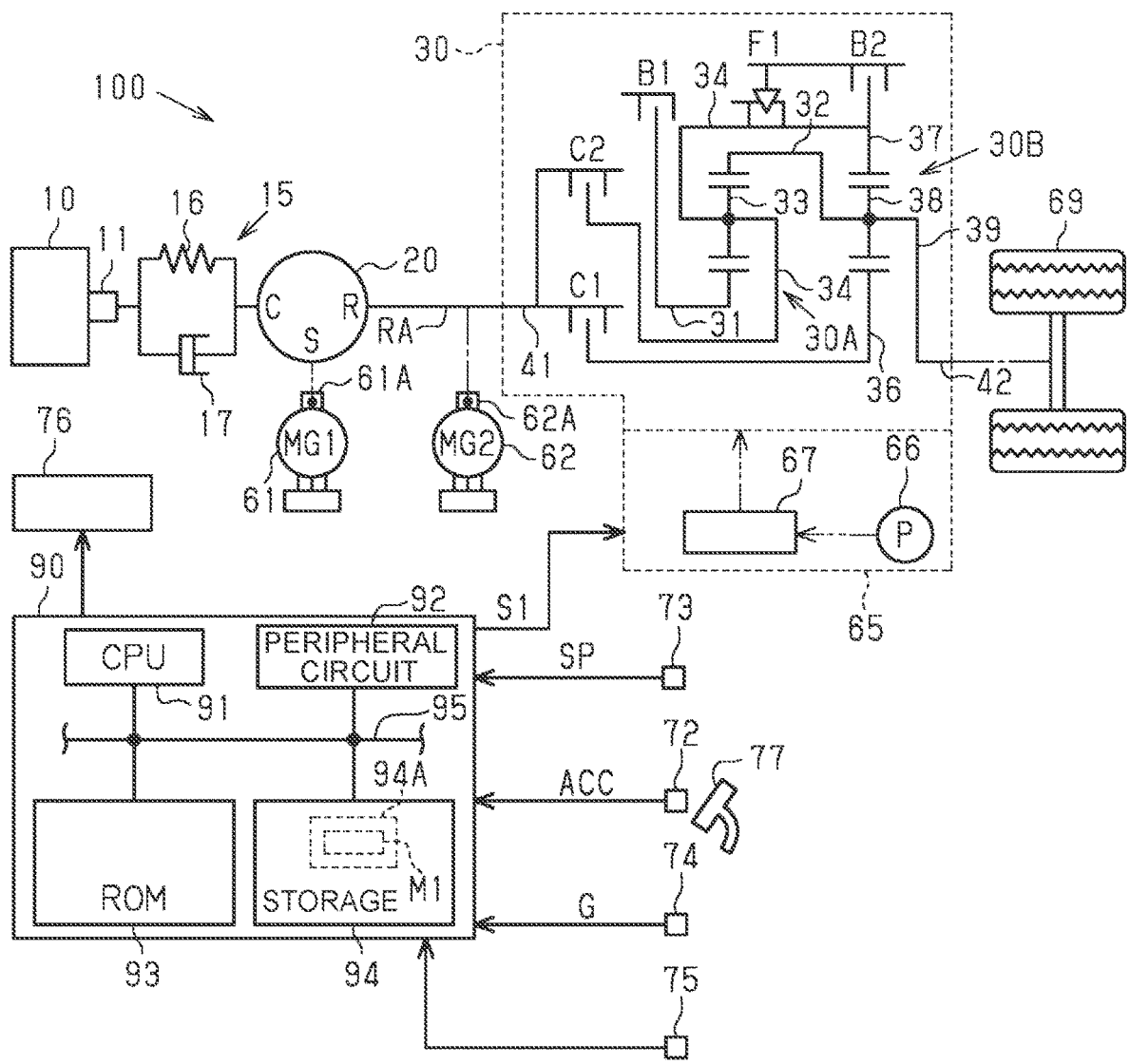
FIG. 8 is a schematic structural diagram of a vehicle according to a modified example.

This embodiment may be modified as follows. This embodiment and the following modified examples may be combined without causing any technical contradiction.
Characteristic Variables In the embodiment described above, the characteristic variables related to the vibration of the vehicle 100 are employed, but characteristic variables related to noise of the vehicle 100 may be employed as well. In an example illustrated in FIG. 8, the vehicle 100 includes a microphone 75 in addition to the components of the embodiment described above. For example, the microphone 75 is located in the vehicle cabin. The microphone 75 detects a sound wave in a frequency band perceivable by humans as noise, such as 20 Hz or higher and 20 kHz or lower. A signal is input to the controller 90 from the microphone 75.

Similarly to the embodiment described above, the CPU 91 of the controller 90 calculates a first power P1 to a 20th power P20, a frequency FR, a duration TA, and a decrease rate DEC based on a sound wave in a predetermined period that is detected by the microphone 75. The controller 90 acquires a maximum amplitude of the sound wave in the predetermined period. The CPU 91 inputs the first power P1 to the 20th power P20, the maximum amplitude, the frequency FR, the duration TA, the decrease rate DEC, a vehicle speed SP, and an accelerator operation amount ACC to the mapping M1 as the input variable x(1) to the input variable x(26).

When a parameter set is input to the model data 241, the CPU 210 of the simulator 200 estimates vibration of the drive system 350 of the vehicle model 300. At this time, the CPU 210 estimates vibration in the frequency band of 20 Hz or higher and 20 kHz or lower. Although the acceleration sensor or the like has difficulty in detecting the vibration in this frequency band because the frequency is high and the amplitude is small, the calculation in the CPU 210 can yield the vibration. The CPU 210 applies the vibration of the drive system 350 to the vehicle model 300 to estimate vibration of the frame 330. The CPU 210 handles the vibration of the frame 330 as a sound wave generated by the vehicle 100, and calculates a first power P1 to a 20th power P20, a maximum amplitude, a frequency FR, a duration TA, and a decrease rate DEC as characteristic variables related to noise.

As described above, the vibration and the noise of the vehicle 100 generally have the same characteristics though the target frequency bands differ from each other. Thus, the same type of technology as that of the embodiment described above can be employed even in the case where the characteristic variables related to the noise of the vehicle 100 are employed as in this modified example.

In the embodiment described above, the characteristic variables may be changed. For example, the number of predetermined frequencies for the calculation of the powers associated with the frequencies based on the power spectrum is not limited to 20, but may be 19 or less or more than 20. To accurately grasp a characteristic of vibration in a wide frequency band by using the power spectrum, the number of frequencies is preferably large to some extent. If a frequency is identified for vibration that changes depending on whether the damper 15 has an abnormality, it is only necessary to calculate at least a power associated with this frequency.

For example, a variable indicating a power spectrum density in a predetermined specific frequency band may be employed as the characteristic variable. As a specific example, the CPU 91 may calculate, from the vibration power spectrum, a total of 20 power densities associated with a predetermined first frequency band to a predetermined 20th frequency band as a first power density PA1 to a 20th power density PA20 in order from the first frequency band. The CPU 91 may use the first power density PA1 to the 20th power density PA20 as the characteristic variables.

For example, an average of the absolute values of the vertical accelerations G acquired in the predetermined period may be used as the characteristic variable. In this case, the average of the absolute values of the vertical accelerations G acquired in the predetermined period is a variable indicating an acceleration of the vehicle 100.

For example, all of the first power P1 to the 20th power P20, the maximum acceleration GM, the frequency FR, the duration TA, and the decrease rate DEC need not essentially be used as the characteristic variables. Any type of characteristic variable and any number of characteristic variables may be employed as long as at least one characteristic variable related to the vibration or the noise of the vehicle 100 is employed.
Parameter Set In the embodiment described above, the parameter set may be changed. Depending on, for example, the structure of the damper 15, the numerical value of a part of the rigidity value K of the damper, the hysteresis value H of the damper, and the gap value GA of the damper has a low possibility of actually falling out of the normal range. In this case, the part of the rigidity value K of the damper, the hysteresis value H of the damper, and the gap value GA of the damper may be omitted from the parameter set and may be set to a fixed value that eliminates the need to input the numerical value. In the training control for the mapping M1 for determining whether the damper 15 has an abnormality, it is only necessary to employ at least one of the rigidity value K of the damper, the hysteresis value H of the damper, and the gap value GA of the damper.

For example, the vehicle speed SP and the accelerator operation amount ACC may be omitted from the parameter set to be input to the model data 241 of the simulator 200. That is, the parameter set may have only the specific parameters indicating the properties of the damper 15. In the case where the vehicle speed SP and the accelerator operation amount ACC are omitted from the parameter set, it is appropriate to handle the vehicle speed SP and the accelerator operation amount ACC as predetermined constant values in the vehicle model 300.
Determination Label The determination label may be set to a value that changes in a range from "0" to "1" instead of being set to "0" or "1".

For example, when the rigidity value K of the damper falls out of the normal range, the determination label may be set closer to "1" as the rigidity value K of the damper is further away from the boundary between the normal range and the abnormal range.

Abnormality Determination Variable

The threshold related to the abnormality determination variable may be changed as appropriate. For example, the accuracy of determination that an abnormality occurs increases as the threshold is made closer to "1". However, this setting increases such an adverse effect that the abnormality cannot be determined even though the abnormality actually occurs.

Simulation Step

In the embodiment described above, the simulation step may be changed. For example, in Step S61, the operator need not essentially input arbitrary values as the parameters. Instead, the CPU 210 may randomly set the parameters.

Training Step

In the embodiment described above, the controller 90 of the vehicle 100 executes the training step, but another apparatus such as the simulator 200 may execute the training step. For example, it is appropriate that the mapping data 94A updated by the simulator 200 be applied to the controller 90 of each vehicle 100.

The values of the vehicle speed SP and the accelerator operation amount ACC contained in the training data TRN need not essentially be equal to the values of the vehicle speed SP and the accelerator operation amount ACC input to the model data 241 when the characteristic variables are calculated.

Input Variables

In the embodiment described above, the input variables of the mapping M1 may be changed. For example, in the case where the characteristic variables are changed as described above, it is appropriate that the input variables be variables to be used as the characteristic variables among the first power P1 to the 20th power P20, the maximum acceleration GM, the frequency FR, the duration TA, and the decrease rate DEC.

Output Variable

In the embodiment described above, the output variable of the mapping M1 may be changed. For example, the number of output variables of the mapping M1 need not be one, but may be plural. As a specific example, the output variables of the mapping M1 may be a variable indicating a possibility that the damper body 16 has an abnormality, and a variable indicating a possibility that the attenuator 17 has an abnormality. In the case where a plurality of output variables is output, abnormalities may be reported in the following manner. That is, the possibilities of the abnormalities may be reported individually. Alternatively, an abnormality having the strongest possibility may be reported alone.

Specific Component

In the embodiment described above, the specific component is not limited to the damper 15. For example, teeth of a gear of the automatic transmission 30 may be worn out or partially chipped due to deterioration of the gear over time. In this case, the vehicle 100 may generate vibration or noise due to the abnormality of the gear of the automatic transmission 30. Similarly, the vehicle 100 may generate vibration or noise due to an abnormality of a gear of the power split device 20. If a model capable of calculating characteristic variables related to the vibration or noise can be derived for the automatic transmission 30 or the power split device 20 based on, for example, a gap value between the gears and physical property values of the gears, the technology of the embodiment described above can be applied to training of mapping for determining the abnormality of the automatic transmission 30 or the power split device 20. In this case, the automatic transmission 30 and the power split device 20 are specific components on the power transmission path from the internal combustion engine 10 serving as the drive source of the vehicle 100 to the driving wheels 69. The same applies to the first motor generator 61 and the second motor generator 62.

The technology for training the mapping in the embodiment described above may be applied to a component that is not located on the power transmission path from the drive source of the vehicle 100 to the driving wheels 69. For example, when the oil pump 66 has an abnormality, the vehicle 100 may generate vibration or noise. If a model capable of calculating characteristic variables related to the vibration or noise can be derived for the oil pump 66 based on specific parameters related to the properties of the oil pump 66, the technology of the embodiment described above can be applied to training of mapping for determining the abnormality of the oil pump 66.

Mapping

In the embodiment described above, the activation function of the mapping is illustrative, and may be changed.

In the embodiment described above, the neural network having one intermediate layer is exemplified as the neural network, but the neural network may have two or more intermediate layers.

In the embodiment described above, the fully connected feedforward neural network is exemplified as the neural network. The present disclosure is not limited to this case. For example, the neural network may be a recurrent neural network.

In the embodiment described above, the function approximate device serving as the mapping is not limited to the neural network. For example, the function approximate device may be a regression equation having no intermediate layer.

Controller and Simulator

In the embodiment described above, the controller 90 is not limited to the device that includes the CPU 91 and the ROM 93 and executes the software process. As a specific example, the controller 90 may include a dedicated hardware circuit such as an application-specific integrated circuit (ASIC) configured to execute a hardware process in place of at least a part of the software process in the embodiment described above. That is, the controller 90 may have one of the following structures (a) to (c).

(a) The controller 90 includes a processor configured to execute all the processes described above based on programs, and a program storage such as a ROM that stores the programs.

(b) The controller 90 includes a processor configured to execute a part of the processes described above based on programs, a program storage, and a dedicated hardware circuit configured to execute the remaining processes.

(c) The controller 90 includes a dedicated hardware circuit configured to execute all the processes described above.

A plurality of devices or circuits may be provided as the software execution device including the processor and the program storage or as the dedicated hardware circuit. The same applies to the simulator 200.

Sensors

In the embodiment described above, the sensors of the vehicle 100 may be changed. For example, the vibration of the vehicle 100 due to the abnormality of the damper 15 may occur as vibration in a longitudinal direction of the vehicle 100 or vibration in a vehicle width direction of the vehicle 100. In this case, an acceleration sensor configured to detect an acceleration in the longitudinal direction of the vehicle 100 or an acceleration sensor configured to detect an acceleration in the vehicle width direction of the vehicle 100 may be employed in place of or in addition to the acceleration sensor 74.

Vehicle

In the embodiment described above, a so-called series-parallel hybrid vehicle is exemplified as the vehicle. The present disclosure is not limited to this case. For example, the vehicle may be a series hybrid vehicle or a parallel hybrid vehicle.

In the embodiment described above, the vehicle is not limited to the vehicle including the internal combustion engine and the motor generator. For example, the vehicle may have the internal combustion engine but need not have the motor generator. For example, the vehicle may have the motor generator but need not have the internal combustion engine.

What is claimed is:

1. A training method for training a mapping that outputs, as an output variable, an abnormality determination variable that (i) indicates an occurrence possibility of an abnormality of a specific component mounted on a vehicle and (ii) is used in a determination process for determining whether or not the specific component has the abnormality, the method comprising:

outputting, by a simulator and based on an input parameter set to the simulator that has a plurality of condition parameters related to conditions of the vehicle, characteristic variables at least one of which indicates a decrease rate of at least one of (i) vibration of the vehicle per unit time and (ii) noise of the vehicle per unit time, the simulator storing model data that defines a vehicle model, which is a model of structure of the vehicle, and outputting the characteristic variables by inputting the input parameter set to the model data, one of the condition parameters being a specific parameter indicating a property of the specific component, and the input parameter set (i) indicating that the specific component is presumed to have the abnormality in advance by (ii) being a parameter set having the specific parameter that falls outside of a predetermined normal range; and updating, by a processor, the mapping based on training data and teaching data, the training data including a plurality of input variables for stored mapping data defining the mapping, the input variables including the characteristic variables output by the simulator, and the teaching data including the abnormality determination variable indicating that the specific component has the abnormality, wherein:

the decrease rate is calculated (i) by subtracting an amplitude of the vibration or noise at an end of a duration of the amplitude or noise from an amplitude of the vibration or noise at a start of the duration and (ii) by dividing a value obtained through the subtraction by the duration;

the specific component is a damper comprising a damper body, which includes an elastic member, and an attenuator; and the characteristic variables based upon which the mapping is updated include (i) a frequency of the damper at a maximum amplitude of vibration that is caused by the damper and is related to an abnormality of the damper body, (ii) a duration of vibration of the damper that is related to an abnormality of the attenuator, and (iii) a decrease rate of the vibration that is related to the abnormality of the attenuator.

2. The method according to claim 1, wherein one of the condition parameters is a vehicle speed.

3. The method according to claim 1, wherein one of the condition parameters is an operation amount of an accelerator pedal.

4. The method according to claim 1, wherein the structure of the vehicle modeled by the vehicle model includes a driving wheel, a suspension, a frame, a mount, and a drive system of the vehicle.

* * * * *